No. 761,439. PATENTED MAY 31, 1904.
J. B. BIRRER.
SHOE STITCH DIVIDER.
APPLICATION FILED NOV. 23, 1903.
NO MODEL. 3 SHEETS—SHEET 1.
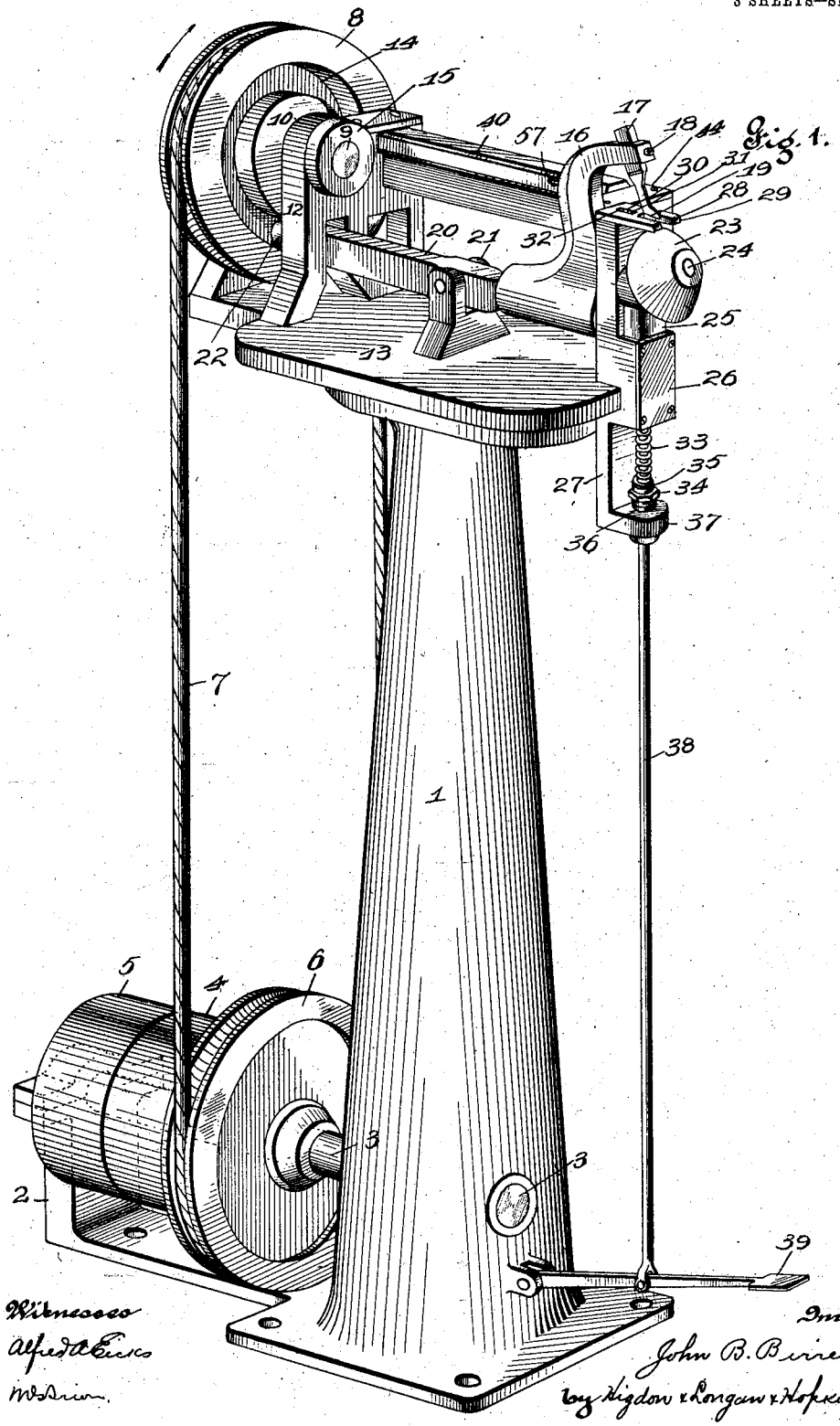
Witnesses
Alfred A. Eicks
W. Brin.
Inventor
John B. Birrer
by Higdon & Longan & Hopkins attys.

No. 761,439. PATENTED MAY 31, 1904.
J. B. BIRRER.
SHOE STITCH DIVIDER.
APPLICATION FILED NOV. 23, 1903.
NO MODEL.
3 SHEETS—SHEET 2.
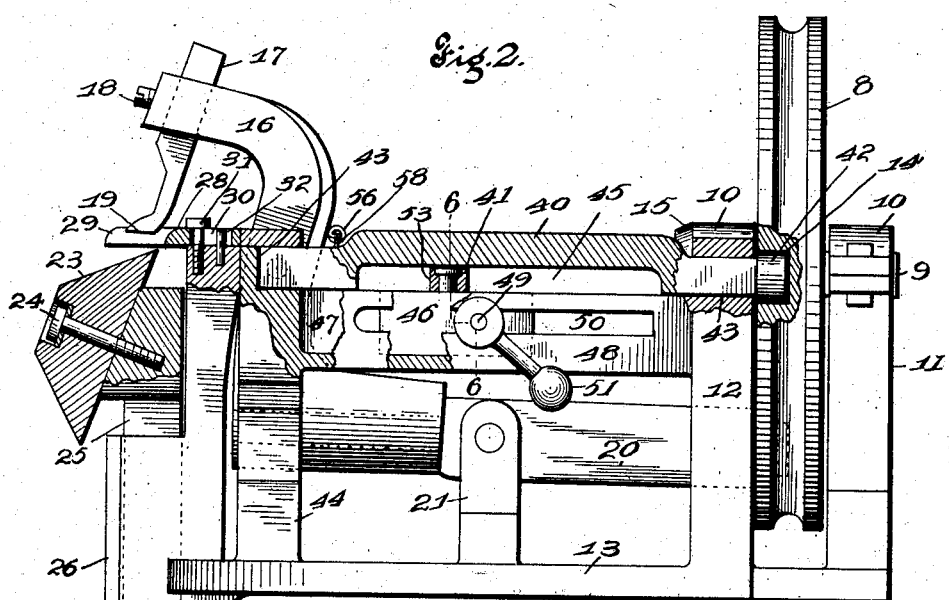

No. 761,439. PATENTED MAY 31, 1904.
J. B. BIRRER.
SHOE STITCH DIVIDER.
APPLICATION FILED NOV. 23, 1903.
NO MODEL. 3 SHEETS—SHEET 3.

Witnesses
Inventor
John B. Birrer
by Higdon Longan & Hopkins Attys.

No. 761,439. Patented May 31, 1904.

UNITED STATES PATENT OFFICE.

JOHN B. BIRRER, OF ST. LOUIS, MISSOURI, ASSIGNOR OF ONE-HALF TO H. C. BIRRER, OF ST. LOUIS, MISSOURI.

SHOE-STITCH DIVIDER.

SPECIFICATION forming part of Letters Patent No. 761,439, dated May 31, 1904.

Application filed November 23, 1903. Serial No. 182,432. (No model.)

*To all whom it may concern:*

Be it known that I, JOHN B. BIRRER, a citizen of the United States, residing at St. Louis, State of Missouri, have invented certain new and useful Improvements in Shoe-Stitch Dividers, of which the following is a specification containing a full, clear, and exact description, reference being had to the accompanying drawings, forming a part hereof.

My invention relates to improvements in shoe-stitch dividers; and it consists of the novel construction, combination, and arrangement of parts hereinafter shown, described, and claimed.

The object of my invention is to provide an improved shoe-stitch divider which shall be very simple, convenient, and reliable.

Figure 4:
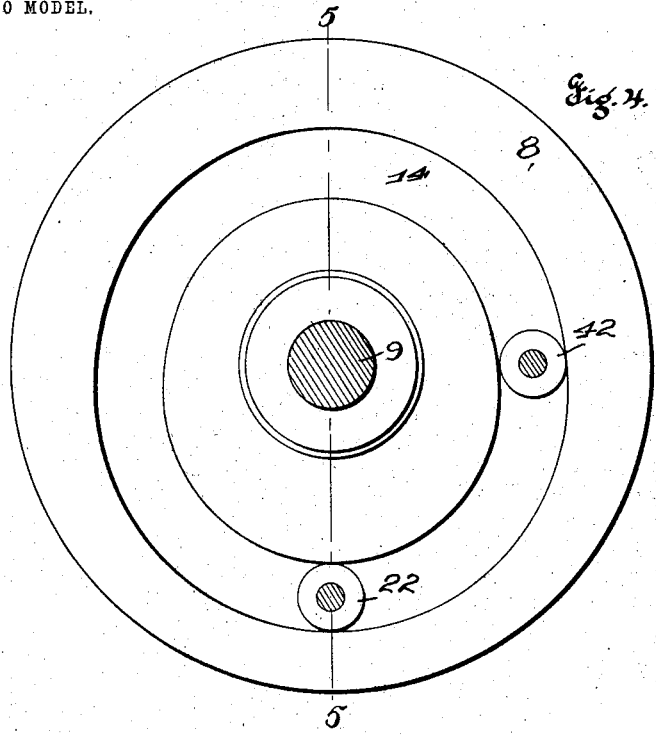
Figure 5:
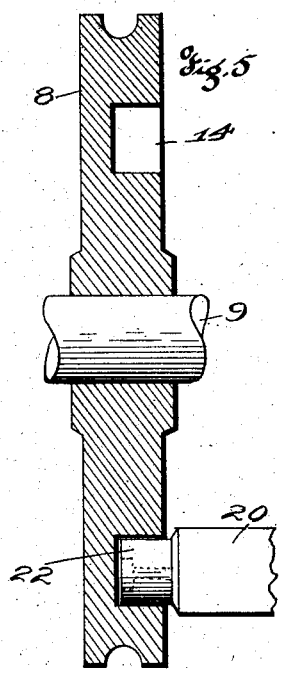
Figure 6:
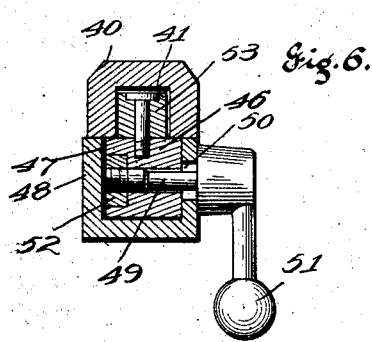

In the drawings, Figure 1 is a perspective view of a machine embodying my invention. Fig. 2 is a sectional side elevation of the upper portion of the machine. Fig. 3 is a sectional top plan view of the vibrating tool-holder and parts connected therewith. Fig. 4 is a face view of the cam-pulley. Fig. 5 is a section through the same, taken on the line 5 5 of Fig. 4. Fig. 6 is a detail sectional view taken on the line 6 6 of Fig. 2.

1 indicates a frame or stand having at its base a lateral extension 2, in which one end of a counter-shaft 3 is journaled, the opposite end of the said shaft being journaled in the stand 1. The counter-shaft carries the usual tight pulley 4, loose pulley 5, and grooved pulley 6. Said grooved pulley is of course fixed upon said shaft and communicates motion through a belt 7 to the cam-pulley 8, which is fixed upon a short shaft 9, having bearings 10 at the upper ends of two short vertical frames 11 and 12, which rise from a platform 13 at the upper end of said stand 1. Said cam-pulley is provided in its face with a cam-groove 14.

15 indicates a collar fixed upon the cam-pulley shaft 9 for the purpose of limiting axial movement thereof in an outward direction.

16 indicates the vibrating tool-holder, which is substantially S-shaped in side view and is provided at its upper end with an angular tool-socket, in which a stitch-dividing tool 17 is clamped by means of a set-screw 18. Said tool 17 preferably has an angular shank at its upper end fitting said tool-socket and has its lower end provided with a creasing edge 19, which latter is of the usual shape and adapted to crease or indent the leather between the stitches of shoe-soles for the purpose of dividing the stitches. Said tool-holder 16 is mounted so that the tool 17 carried by it will be vibrated in two directions, one of which is vertical and the other substantially horizontal. Such vertical movement is accomplished by a lever 20, pivoted intermediate of its length upon a bracket 21, fixed centrally upon the upper surface of the said platform 13, and which lever carries at one end a roller 22 and at the opposite end said vibrating tool-holder 16. Said roller 22 operates in the cam-groove 14 of the cam-pulley 8. Said tool-holder is loosely mounted to rock upon said lever 20, the base of said tool-holder being in the form of a sleeve which is loosely mounted upon the corresponding rounded portion of said lever 20.

The work is supported beneath the tool 17 upon a conical roll 23, which is by means of a pin 24 mounted to rotate at the upper end of the guide-bar 25, which bar is preferably angular in cross-section and mounted to slide vertically in a suitable bearing 26, formed in the vertical standard 27, connected to the front of said platform 13. Projecting over said conical roll 23 is a stationary horizontal presser-bar 28, which is provided at its free end with a bifurcation 29, within which the lower end of said tool 17 vibrates during operation, and said presser-bar is provided near its inner end with a slot 30, through which passes a clamping-screw 31 and by means of which said presser-bar may be adjusted. A pin 32 also extends into said slot 30 in order to guide the said presser-bar during its adjustment. Said guide-bar 25 and the conical roll 23 are normally retained at the limit of their upward movement by means of a coiled spring 33, the upper end of which engages the lower end of said guide-bar, and the lower end of which spring rests upon an adjusting-nut 34, which is mounted upon a threaded nipple 35, fixed within a threaded aperture 36 of a horizontal arm 37 at the lower end of said standard 27.

A treadle-rod 38 has its lower end connected to a treadle 39, which is pivoted at its inner end to said stand 1, and said treadle-rod extends upwardly through said nipple 35, and its upper end is firmly screwed within or otherwise connected to the said guide-bar 25, so that the latter may be depressed in opposition to the power of said spring 33 whenever occasion requires.

In my machine the work is fed by vibrating the tool-holder 16 and its tool 17 in a direction substantially at right angles to the direction in which said parts are vibrated during the act of indenting the shoe-sole. For imparting the feed motion to the said tool I make use in the present instance of a feed-lever 40, which is provided with an adjustable pivot 41, and said lever carries at one end a roller 42, which latter engages the said cam-groove 14 of the cam-pulley 8. Said feed-lever 40 moves in guide-bearings 43 at the upper ends of the short vertical frame 12 and an additional standard 44; but its pivot 41 may be moved in a groove 45 in order to change its pivotal point to increase or diminish the length of the feed-stroke. The adjustment of the said pivot is accomplished by mounting the said pivot upon a sliding block 46, which is mounted to slide in a groove 47, formed in the horizontal bar 48, which connects the said short vertical frame 12 and said standard 44. The adjustment of said block in said groove 47 is controlled by a screw or bolt 49, which passes through a slot 50 in the side wall of said horizontal bar 48 and is provided with a handle 51. The inner end of said screw 49 is provided with a nut 52, so that when the screw is turned said nut will clamp the said block 46 tightly against the side wall of the said horizontal bar, and thereby lock the block at the desired adjustment. Said nut 52 is countersunk into the said block 46. (See Fig. 6.) The pivot 41 has its lower end secured to said block and carries a roller 53. The front end of said feed-lever 40 engages a horizontal pin 54, mounted loosely in a bearing 55, formed in the upper portion of the said standard 44, and said pin bears against the side of the vibrating tool-holder. A spring 56 holds the said tool-holder and said feed-lever in contact with the ends of said pin at all times, one end of said spring being attached to a hook 57, projecting from said tool-holder, and the opposite end of said spring being secured to a pin 58, projecting upwardly from the top of said feed-lever.

The operation is as follows: Motion communicated to the counter-shaft 3 will be conveyed to the cam-pulley 8 by the belt 7, and the rotation of said pulley will cause the tool-holder lever 20 and the feed-lever 40 to be alternately vibrated by reason of the fact that the rollers 22 and 42 are mounted within the cam-groove 14 of said pulley. The vibration of the lever 20 will take place in a vertical plane and will cause the tool-holder 16 and its tool 17 to be vibrated in the same plane, and the edge of said tool will be alternately elevated and depressed and will engage the sole of the shoe supported upon the conical roll 23, and the stitches of said sole will be thereby divided by creasing the leather between such stitches. The work is held securely against the under side of the presser-bar 28 by the spring 33 urging the said guide-bar 25 and said conical roll 23 upwardly. When it is desired to remove the work or to place new work in position, the said roll should be depressed by means of the foot-lever 39. Immediately after the tool has made a downward stroke the feed-lever 40 will be moved by its roll 42 engaging the walls of said cam-groove 14, and the opposite end of said lever will press the pin 55 against the side of the said tool-holder, and the latter will be moved a corresponding distance and carry the tool with it, and the tool engaging the work will cause the work to be fed step by step. When it is desired to change the feed-stroke to make a longer stroke, the pivot 41 of the feed-lever 40 is moved nearer to the cam-pulley and secured by means of the screw 49 and its handle 51. When it is desired to produce a shorter stroke, said pivot 41 should of course be moved in an opposite direction.

I do not limit myself to the identical details of construction herein shown, as it is obvious that the same may be modified by skilled mechanics without departing from the scope of my invention.

I claim—

1. In a shoe-stitch divider; a suitable stand; a cam-pulley mounted upon the stand and having a cam-groove in its front face; a lever pivotally mounted upon the stand in a plane parallel with the shaft of the cam-pulley and in vertical alinement below the shaft, and with its rear end extending into the cam-groove; a tool-holder mounted upon the forward end of said lever so as to be vibrated up and down as the cam-pulley rotates and adapted to rock laterally; a second lever pivotally mounted upon the stand in a plane parallel with the shaft of the cam-pulley and in horizontal alinement with the shaft, the rear end of said lever extending into the cam-groove; and a connection between the forward end of said lever and the tool-holder, so that the tool-holder is rocked as the cam-pulley rotates; substantially as specified.

2. In a shoe-stitch divider; a suitable stand; a cam-pulley mounted upon the stand and having a cam-groove in its front face; a lever pivotally mounted upon the stand in a plane parallel with the shaft of the cam-pulley and in vertical alinement below the shaft, and with its rear end extending into the cam-groove; a tool-holder mounted upon the forward end of said lever so as to be vibrated up and down as the cam-pulley rotates and adapted to rock laterally; a second lever pivotally mounted upon the stand in a plane parallel with the shaft, the rear end of said lever extending into the cam-groove; a connection between the forward end of said lever and the tool-holder, so that the tool-holder is rocked as the cam-pulley rotates; a tool carried by said tool-holder; a presser-bar through which the tool operates; a roller beneath the presser-bar; a spring to press the roller against the presser-bar; and a treadle for pulling the roller away from the presser-bar; substantially as specified.

3. In a shoe-stitch divider; a suitable stand; a cam-pulley mounted upon the stand and having a cam-groove in its front face; a lever pivotally mounted upon the stand in a plane parallel with the shaft of the cam-pulley and in vertical alinement below the shaft, and with its rear end extending into the cam-groove; a tool-holder mounted upon the forward end of said lever so as to be vibrated up and down as the cam-pulley rotates and adapted to rock laterally; a second lever pivotally mounted upon the stand in a plane parallel with the shaft; the rear end of said lever extending into the cam-groove; a connection between the forward end of said lever and the tool-holder, so that the tool-holder is rocked as the cam-pulley rotates; and means of adjusting the pivot of said second lever to regulate the distance which the tool-holder is rocked; substantially as specified.

In testimony whereof I have signed my name to this specification in presence of two subscribing witnesses.

JOHN B. BIRRER.

Witnesses:
   ALFRED A. EICKS,
   M. G. IRION.